US006734644B2

United States Patent
Kaneko et al.

(10) Patent No.: US 6,734,644 B2
(45) Date of Patent: May 11, 2004

(54) CONTROL METHOD FOR WIPER APPARATUS

(75) Inventors: Noboru Kaneko, Yokohama (JP); Koji Aoki, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 0 days.

(21) Appl. No.: 10/303,919

(22) Filed: Nov. 26, 2002

(65) Prior Publication Data

US 2003/0110586 A1 Jun. 19, 2003

(30) Foreign Application Priority Data

Nov. 27, 2001 (JP) ..................................... P2001-361721

(51) Int. Cl.$^7$ ................................................ G05B 5/00
(52) U.S. Cl. ......................... 318/105; 318/443; 318/34; 318/41; 318/55; 318/67
(58) Field of Search ............................. 318/34–35, 37, 318/41, 53, 55, 85, 66–67, 364, 375, 443, 444, DIG. 2

(56) References Cited

U.S. PATENT DOCUMENTS

| 4,585,980 A | * | 4/1986 | Gille et al. .................. 318/444 |
| 4,663,575 A | * | 5/1987 | Juzswik et al. .............. 318/444 |
| 4,670,695 A | * | 6/1987 | Licata et al. ................ 318/443 |
| 5,568,026 A | * | 10/1996 | Welch ......................... 318/443 |
| 6,288,509 B1 | * | 9/2001 | Amagasa ..................... 318/443 |

* cited by examiner

Primary Examiner—Rina I Duda
(74) Attorney, Agent, or Firm—McGinn & Gibb, PLLC

(57) ABSTRACT

A method (and apparatus) includes that a duty ratio of a driving voltage output to each wiper motor be required to be set according to several conditions. That is, while each wiper blade is moved in an interval from a starting position to a predetermined first wiping position in an upward operation, the duty ratio of a wiper motor on a driver's seat side is set so that the duty ratio is larger than the duty ratio of a wiper motor on a passenger seat side. Also, while each wiper blade is moved in another interval from each upper return position to a predetermined second wiping position in a return operation, the duty ratio of the wiper motor on the passenger seat side is set so that the duty ratio is larger than the duty ratio of the wiper motor on the driver's seat side.

10 Claims, 6 Drawing Sheets

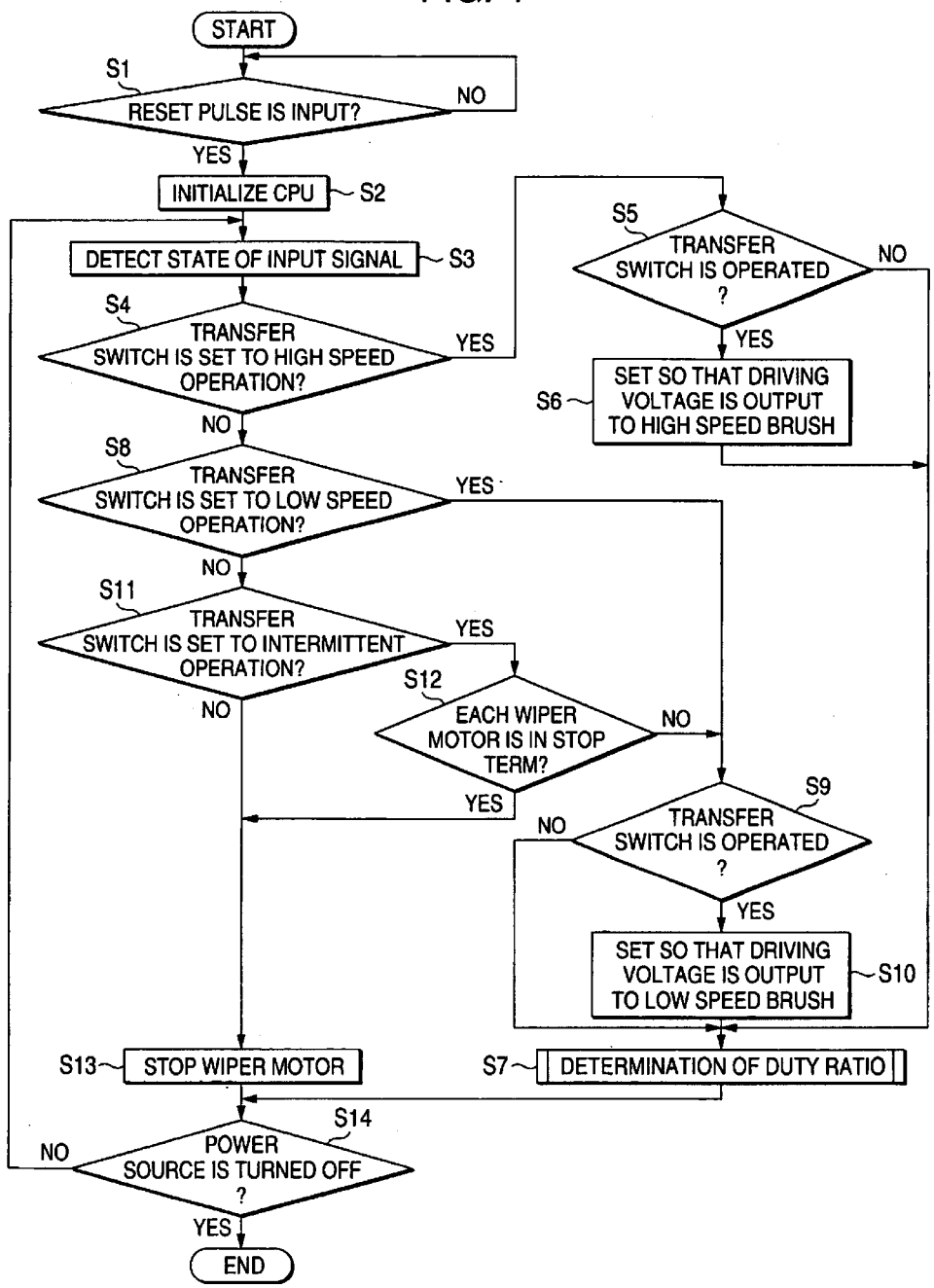

CONTROL METHOD FOR WIPER APPARATUS

The present application is based on Japanese Patent Application No. 2001-361721, which is incorporated herein by reference.

BACKGROUND OF THE INVENTION

1. Field of the Invention

The present invention relates to a method of controlling a wiper apparatus for wiping windshield.

2. Description of the Related Art

Recently, for a wiper apparatus for wiping a windshield, a wiper apparatus (an overlap-type wiper apparatus) having configuration that a pair of wiper blades are driven by separate wiper motors and areas which both wiper blades wipe are overlapped in a fixed range has been developed.

FIG. 1 shows the outline of an overlap-type wiper apparatus. As shown in FIG. 1, the overlap-type wiper apparatus is provided with a wiper blade 10 on a driver's seat side as a first wiper blade and a wiper blade 20 on a passenger seat side as a second wiper blade. Driving force from a wiper motor 11 on the driver's seat side as a first wiper motor is transmitted to the wiper blade 10 on the driver's seat side via a link mechanism 12. In the meantime, driving force from a wiper motor 21 on the passenger seat side as a second wiper motor is transmitted to the wiper blade 20 on the passenger seat side via a link mechanism 22.

Normally, the wiper motor 11 on the driver's seat side is rotated in one direction and the link mechanism 12 converts the rotational driving force to the reciprocative turning operation of the wiper blade 10 on the driver's seat side. Hereby, the wiper blade 10 on the driver's seat side is reciprocated between a starting position 2 set on the lower edge of a windshield 1 and a upper return position 3 set on one side edge of the windshield 1.

Similarly, the wiper motor 21 on the passenger seat side is also normally rotated in one direction and the link mechanism 22 converts the rotational driving force to the reciprocative turning operation of the wiper blade 20 on the passenger seat side. Hereby, the wiper blade 20 on the passenger seat side is also reciprocated between a starting position 2 set on the lower edge of the windshield 1 and a upper return position 4 set on the other side edge of the windshield 1.

The reciprocation of each wiper blade 10, 20 is started from each starting position 2, however, to avoid interference between each other, control is made so that one wiper blade 10 or 20 is moved first and the other wiper blade 20 or 10 is moved succeedingly. Generally, for operation from the starting position 2 to the upper return position 3 or 4, the wiper blade 10 on the driver's seat side is moved first and the wiper blade 20 on the passenger seat side is moved succeedingly. Conversely, for operation from the upper return position 3 or 4 to the starting position 2, the wiper blade 20 on the passenger seat side is moved first and the wiper blade 10 on the driver's seat side is moved succeedingly.

The wiper blade 10 on the driver's seat side wipes a first wiped area 1A of the windshield 1 and the wiper blade 20 on the passenger seat side wipes a second wiped area 1B of the windshield 1. These areas 1A and 1B wiped by each wiper blade are set so that they are overlapped in an area 1C hatched in FIG. 1 (hereinafter called an overlap area).

In the overlap-type wiper apparatus having the configuration described above, each wiper motor 11, 21 is controlled so that it is driven in synchronization with each other, however, the wiping speed of each wiper blade 10, 20 may vary unstably due to various external or internal causes such as the dispersion of wiping resistance to each wiper blade 10, 20. In case the wiping speed of each wiper blade 10, 20 varies unstably, it is supposed that the wiper blade moved subsequently catches up with the precedent wiper blade and collides with it particularly in the overlap area.

SUMMARY OF THE INVENTION

The invention is made in view of such a situation and the object is to ensure the optimum wiping operation in which relation in order between each wiper blade is maintained and to prevent collision in an overlap area.

In the invention, the wiper apparatus adapted for a vehicle is provided with a first wiper blade for being reciprocated between a first starting position set on a lower edge of windshield and one upper return position set on one side edge of the windshield and wiping a first wiped area of the windshield, a second wiper blade for being reciprocated between a second starting position set on the lower edge of the windshield and the other upper return position set on the other side edge of the windshield and wiping a second wiped area of the windshield, a first wiper blade for driving the first wiper blade and a second wiper motor for driving the second wiper blade and configured so that each wiper blade wipes an overlap area in which the first wiped area and the second wiped area are overlapped in a state in which the wiper blades are overlapped.

In upward operation from the starting position toward the upper return position, the first wiper blade is moved in the overlap area prior to the second wiper blade and in return operation from the upper return position toward the starting position, the second wiper blade is moved in the overlap area prior to the first wiper blade.

The invention is characterized in that an output level of current to each wiper motor is controlled so that at least the following conditions (a) and (b) are met in the wiper apparatus.

(a) An output level of current to the first wiper motor is set to be higher than an output level of current to the second wiper motor when each wiper blade is moved in an area from the starting position to a predetermined first wiping position in the upward operation.

(b) The output level of current to the second wiper motor is set to be higher than the output level of current to the first wiper motor, when each wiper blade is moved in an area from each upper return position to a predetermined second wiping position in the return operation.

As described above, the preceding first wiper blade in the upward operation can be moved faster than the second wiper blade moved succeedingly by setting the output level of current to the first wiper motor to a larger value for a while since the start of the upward operation. The preceding second wiper blade in the return operation can be moved faster than the first wiper blade moved succeedingly by setting the output level of current to the second wiper motor for a while since the start of the return operation to a larger value. As a result, suitable wiping operation in which relation between the preceding and succeeding wiper blades is kept is ensured and the collision in the overlap area can be prevented.

It is desirable that the first wiping position is set in the vicinity of the trailing edge of the overlap area and it is also desirable that the second wiping position is set in the vicinity of the entry edge into the overlap area. The collision of each wiper blade in the overlap area can be more securely prevented by setting as described above.

The invention is further characterized in that the output level of current to each wiper motor is controlled so that the following conditions (c) and (d) are met in addition to the conditions (a) and (b).

(c) The output level of current to the second wiper motor is set to be higher than the output level of current to the first wiper motor when each wiper blade is moved in an area from the first wiping position to each upper return position in the upward operation.

(d) The output level of current to the first wiper motor is set to be higher than the output level of current to the second wiper motor, when each wiper blade is moved in an area from the second wiping position to the starting position in the return operation.

The wiper blade moved succeedingly is faster moved than the preceding wiper blade by controlling the output level of current to each wiper motor as described above and difference in the quantity of relative movement between each wiper blade broadened by the control in the conditions (a) and (b) can be reduced.

The output level of current to each wiper motor can be controlled by a value acquired by dividing the output period of driving voltage output to each wiper motor by an output cycle. The value is called duty ratio and the overlap-type wiper apparatus normally controls the driving of each wiper motor at duty ratio.

Further, the present invention provides a wiper apparatus adapted for a vehicle, comprising:

a first wiper blade for wiping a first wiped area of a windshield, the first wiper blade being reciprocated between a first starting position set on a side of a lower edge of the windshield and a first upper return position set on a side of a first side edge of the windshield;

a first wiper motor for driving the first wiper blade;

a first motor driving circuit for outputting driving voltage input to the first wiper motor so as to rotate the first wiper motor;

a second wiper blade for wiping a second wiped area of the windshield, the second wiper blade being reciprocated between a second starting position set on the lower edge of the windshield and a second upper return position set to a side of a second side edge of the windshield;

a second wiper motor for driving the second wiper blade; and a second motor driving circuit for outputting driving voltage input to the first wiper motor so as to rotate the first wiper motor;

wherein the first and second wiper blades wipe an overlap area defined by an area on which the first wiped area and the second wiped area are overlapped such that the first wiper blade is moved in the overlap area prior to the second wiper blade in an overlapping manner in an upward operation from the starting positions to the upper return positions respectively, and such that the second wiper blade is moved in the overlap area prior to the first wiper blade in a return operation from the upper return positions to the starting positions, wherein each motor driving circuit changes a mean output level of current to each wiper motor so that:

(a) an output level of current to the first wiper motor is set to be higher than an output level of current to the second wiper motor, when the wiper blade is moved from the starting position to a predetermined first wiping position in the upward operation; and (b) the output level of current to the second wiper motor is set to be higher than the output level of current to the first wiper motor, when the second wiper blade is moved from each upper return position to a predetermined second wiping position in the return operation.

BRIEF DESCRIPTION OF THE DRAWINGS

FIG. 4 is a flowchart showing a main routine related to a method of controlling the wiper apparatus equivalent to the embodiment of the invention;

DESCRIPTION OF THE PREFERRED EMBODIMENT

Figure 1:
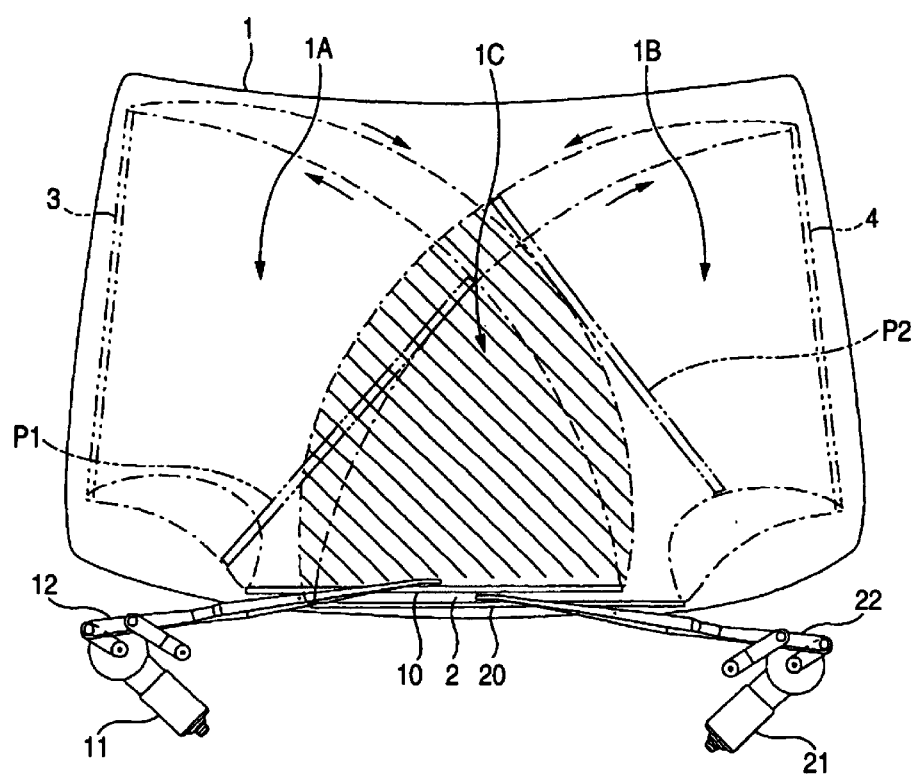
FIG. 1 shows an outline of an overlap-type wiper apparatus.

Referring to the drawings, an embodiment in which the invention is applied to an overlap-type wiper apparatus having configuration shown in FIG. 1 will be described in detail below.

As shown in FIG. 1, a wiper apparatus equivalent to this embodiment is configured so that the driving force of a wiper motor on a driver's seat 11 (a first wiper motor) is transmitted to a wiper blade 10 on the side of the driver's seat (a first wiper blade) via a link mechanism 12, the driving force of a wiper motor 21 on the side of a passenger seat (a second wiper motor) is transmitted to a wiper blade 20 on the side of the passenger seat (a second wiper blade) via a link mechanism 22, these wiper blades 10 and 20 are overlapped and wipe windshield 1.

(Configuration of Control System)

Figure 2:
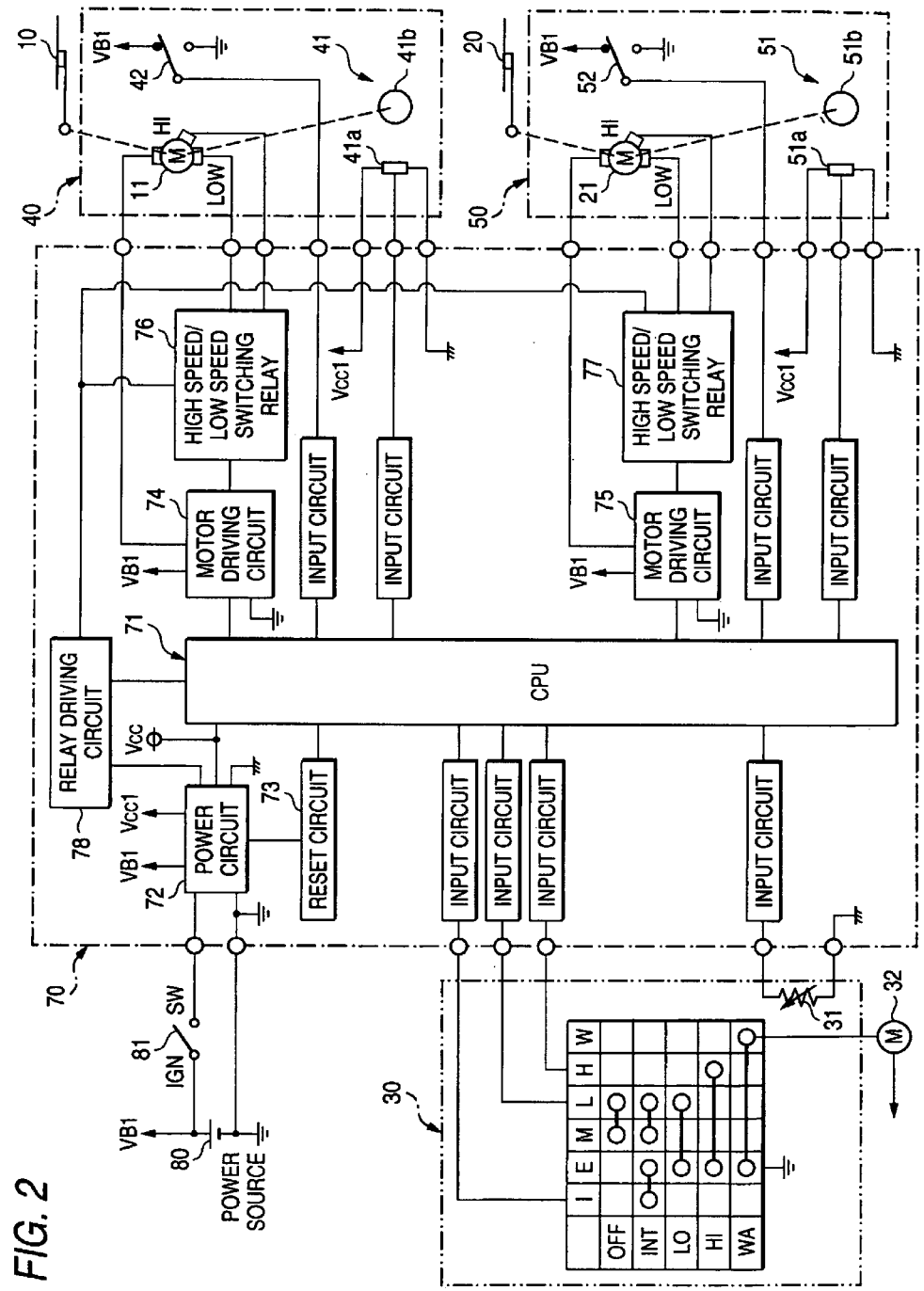
FIG. 2 is a circuit block diagram showing a control system of the overlap-type wiper apparatus equivalent to an embodiment of the invention.

FIG. 2 is a circuit block diagram showing a control system for the wiper apparatus.

As shown in FIG. 2, a main part of the control system is composed of a transfer switch 30, a detector 40 on the driver's seat side, a detector 50 on the passenger seat side and a controller 70, and the controller 70 includes a central processing unit (hereinafter called CPU) 71, a power circuit 72, a reset circuit 73, a motor driving circuit 74 on the driver's seat side, a motor driving circuit 75 on the passenger seat side, a high speed/low speed switching relay 76 on the driver's seat side, a high speed/low speed switching relay 77 on the passenger seat side and a relay driving circuit 78.

The transfer switch (the wiper switch) 30 is a switch for switching the operation mode of each wiper motor 11, 21 to any of "off", "intermittent operation", "low-speed operation" and "high-speed operation".

When any operation mode except "off" is selected by the transfer switch 30, a signal corresponding to the operation mode (an operation mode signal) is input to CPU 71 via an input circuit of the controller 70. When "off" is selected, no operation mode signal is output.

CPU 71 discriminates the selection of an operation mode by the transfer switch 30 based upon whether an operation mode signal is input or not and the contents. CPU 71 controls the driving of each wiper motor 11, 21 according to the corresponding operation mode based upon the input operation mode signal. An intermittent operation volume control 31 for setting an interval of driving between the wiper motors 11 and 21 in an intermittent operation mode is provided to the transfer switch 30.

The transfer switch 30 also functions as a switch for operating a washer motor 32 and when the transfer switch 30 is switched to a washer mode, driving voltage is output to the washer motor 32. The washer motor 32 is rotated by the driving voltage and jets a cleaning solvent toward the windshield 1.

The detector 40 on the driver's seat side includes a rotational amount detecting sensor 41 and a starting position detecting switch 42.

Of them, the rotational amount detecting sensor 41 is a sensor for detecting the rotational amount from the home position of the wiper motor 11 on the driver's seat side and is composed of Hall element 41a provided in a housing (not shown) of the wiper motor 11 on the driver's seat side and a magnet 41b attached to the armature shaft of the same motor 11. The magnet 41b is formed by alternately mounting the north pole and the south pole at an interval of 90° and when each magnet 41b is rotated integrally with the armature shaft and comes in a position opposite to the Hall element 41a, positive and negative electromotive force is alternately output from Hall element 41a. The waveform of the electromotive force is shaped in an input circuit of the controller 70 and two rotational pulses are input to CPU 71 every rotation of the wiper motor 11 on the driver's seat side.

CPU 71 recognizes the rotational amount of the wiper motor 11 on the driver's seat side based upon these rotational pulses, that is, a position in which the wiper blade 10 on the driver's seat side wipes.

The starting position detecting switch 42 is a switch for detecting that the wiper blade 10 on the driver's seat side reaches a starting position 2. As already described, the starting position 2 is set on the lower edge of the windshield 1 as shown in FIG. 1 and normally, the driving of the wiper motor 11 on the driver's seat side is controlled with a rotational position corresponding to the starting position 2 as a home position. The starting position detecting switch 42 is attached to a rotating system such as a worm wheel fixed to the output shaft of the wiper motor 11 on the driver's seat side synchronized with the reciprocative operation of the wiper blade 10 on the driver's seat side and when the wiper blade 10 on the driver's seat side reaches the starting position 2, a starting position detection signal is input to CPU 71 via the input circuit of the controller 70 from the starting position detecting switch 42.

CPU 71 recognizes that the wiper blade 10 on the driver's seat side reaches the starting position 2 by the input of the starting position detection signal and initializes the cumulative rotational amount of the wiper motor 11 on the driver's seat side based upon rotational pulses from the rotational amount detecting sensor 41.

The detector 50 on the passenger seat side also includes a rotational amount detecting sensor 51 composed of Hall element 51a and a magnet 51b and a starting position detecting switch 52. These components are composed in the same way as the detector 40 on the driver's seat side.

The rotational amount detecting sensor 51 is a sensor for detecting the rotational position from a home position of the wiper motor 21 on the passenger seat side and two rotational position pulses are input to CPU 71 via an input circuit every rotation of the wiper motor 21 on the passenger seat side.

CPU 71 recognizes the rotational amount of the wiper motor 21 on the driver's seat side based upon the rotational pulses, that is, a position in which the wiper blade 20 on the passenger seat side wipes.

The starting position detecting switch 52 is a sensor for detecting that the wiper blade 20 on the passenger seat side reaches a starting position 2 and when the wiper blade 20 on the passenger seat side reaches the starting position 2, a starting position detection signal is input to CPU 71 via the input circuit of the controller 70 from the starting position detecting switch 52.

CPU 71 recognizes that the wiper blade 20 on the passenger seat side reaches the starting position 2 by the input of the starting position detection signal and initializes the cumulative rotational amount of the wiper motor 21 on the passenger seat side based upon rotational pulses from the rotational amount detecting sensor 51.

Next, the configuration of the controller 70 will be described.

The power circuit 72 is a circuit for converting voltage supplied from a power source 80 to voltage required for driving the wiper apparatus and outputting the voltage. A starting switch 81 for executing the supply or the stop of power is provided on a power supply line from the power source to the power circuit 72. Generally, the starting switch 81 is interlocked with an engine key of a vehicle.

The reset circuit 73 is a circuit for initializing a memory in CPU 71 when power is supplied to the power circuit 72 because the starting switch 81 is turned on.

Figures 3A, 3B, 3C:
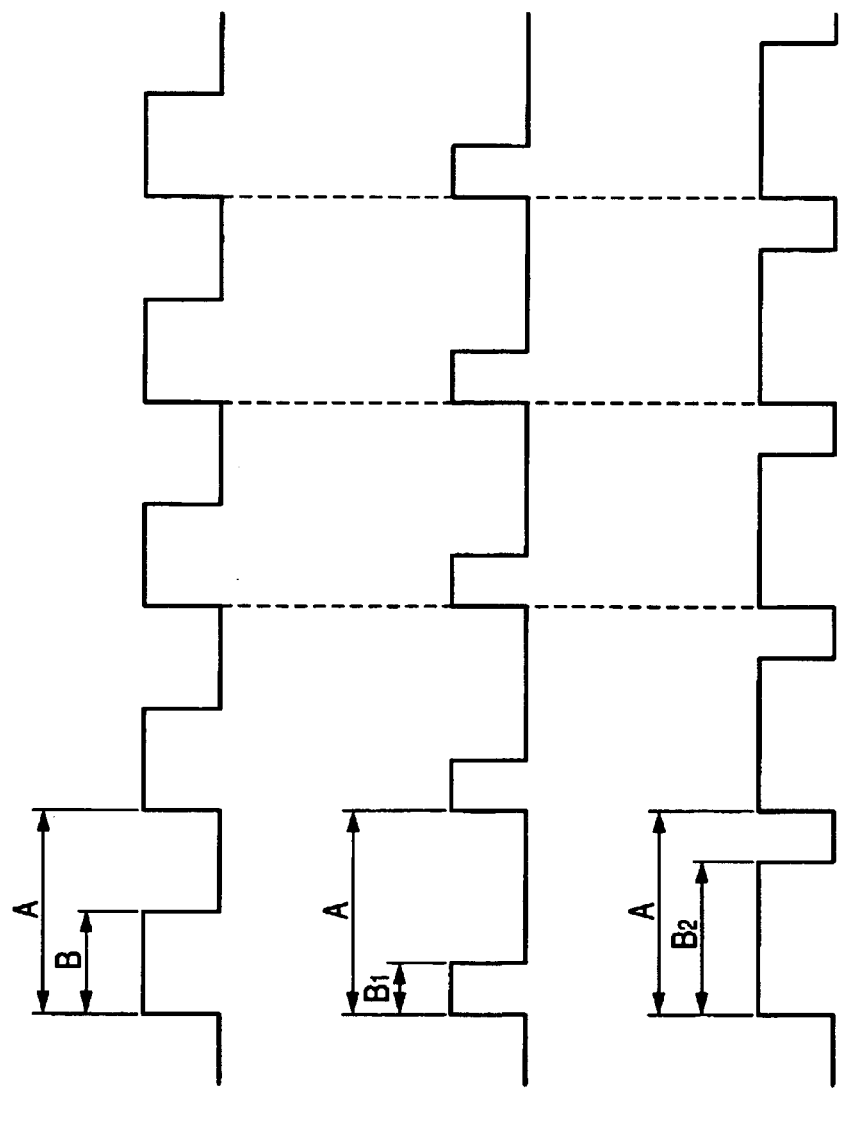
FIGS. 3A to 3C explain the duty ratio of driving voltage output to a brush of each wiper motor.

The motor driving circuit 74 on the driver's seat side is a circuit for outputting driving voltage input from the power circuit 72 to a brush of the wiper motor 11 on the driver's seat side and rotating the wiper motor 11 on the driver's seat side. Driving voltage is intermittently output to the brush of the wiper motor 11 on the driver's seat side at a fixed time interval as shown in FIG. 3A. A value B/A acquired by dividing the output period B of the driving voltage by an output cycle A is called duty ratio, an output level of current to the wiper motor 11 on the driver's seat side is adjusted based upon the duty ratio and hereby, the rotational speed of the wiper motor 11 on the driver's seat side is controlled.

That is, as shown in FIG. 3B, as a value of driving current that flows to the wiper motor 11 on the driver's seat side is reduced when the output period $B_1$ of driving voltage is reduced, the rotational speed of the wiper motor 11 on the driver's seat side is slowed. In the meantime, as shown in FIG. 3C, as a value of driving current that flows to the wiper motor 11 on the driver's seat side is increased when the output period $B_2$ of driving voltage is increased, the rotational speed of the wiper motor 11 on the driver's seat side is accelerated.

The duty ratio is set based upon a speed command signal (a PWM signal) output from CPU 71 to the motor driving circuit 74 on the driver's seat side.

The motor driving circuit 75 on the passenger seat side is also provided with the similar configuration and function to the motor driving circuit 74 on the driver's seat side and is a circuit for outputting driving voltage input from the power circuit 72 to the brush of the wiper motor 21 on the passenger seat side and rotating the wiper motor 21 on the passenger seat side. Driving voltage is also output to the brush of the wiper motor 21 on the passenger seat side from the motor driving circuit 75 on the passenger seat side at duty ratio set based upon a speed command signal from CPU 71.

The high speed/low speed switching relay 76 on the driver's seat side is a relay for selecting a brush to which the driving voltage is output of a low speed brush and a high speed brush respectively provided to the wiper motor 11 on the driver's seat side. Similarly, the high speed/low speed switching relay 77 on the passenger seat side is a relay for selecting a brush to which the driving voltage is output of a low speed brush and a high speed brush respectively provided to the wiper motor 21 on the passenger seat side.

In this embodiment, a motor called a three-brush motor is used for each wiper motor 11, 21. In the three-brush motor, when the driving voltage is output between a common brush and the low speed brush, the rotational speed of the armature shaft (that is, the rotational speed of the motor) is slowed and in the meantime, when the driving voltage is output between the common brush and the high speed brush, the rotational speed of the motor is accelerated.

The relay driving circuit 78 is a circuit for driving each high speed/low speed switching relay 76, 77 and a switching signal is output to each high speed/low speed switching relay 76, 77 from the relay driving circuit 78 based upon a command signal from CPU 71. Each high speed/low speed switching relay 76, 77 selects the brush (the high speed brush or the low speed brush to which the driving voltage is output based upon the switching signal.

That is, CPU 71 outputs a command signal instructing the relay driving circuit 78 to select the low speed brush when an operation mode signal showing low speed operation is input from the transfer switch 30. The relay driving circuit 78 controls based upon the command signal so that each high speed/low speed switching relay 76, 77 is switched and sets so that driving voltage from each motor driving circuit 74, 75 is output to the low speed brush.

CPU 71 also outputs a command signal instructing the relay driving circuit 78 to select the high speed brush when an operation mode signal showing high speed operation is input from the transfer switch 30. The relay driving circuit 78 controls based upon the command signal so that each high speed/low speed switching relay 76, 77 is switched and sets so that the driving voltage from each motor driving circuit 74, 75 is output to the high speed brush.

In case an operation mode is intermittent operation, the low speed brush is used in each wiper motor 11, 21. That is, CPU 71 outputs a command signal instructing the relay driving circuit 78 to select the low speed brush when an operation mode signal showing intermittent operation is input from the transfer switch 30. The relay driving circuit 78 controls based upon the command signal so that each high speed/low speed switching relay 76, 77 is switched and sets so that the driving voltage from each motor driving circuit 74, 75 is output to the low speed brush. Further, in the intermittent operation mode, each motor driving circuit 74, 75 is controlled at a driving interval set by the intermittent operation volume control 31, and the output and the stop of a driving voltage pulse are intermittently repeated from each motor driving circuit 74, 75.

(Control Method of the Wiper Apparatus)

Next, a control method of the wiper apparatus by the control system described above will be described.

FIG. 4 is a flowchart showing a main routine related to the control method of the wiper apparatus. The control system controls each wiper motor 11, 21 according to the flowchart shown in FIG. 4.

First, when current from the power source 80 is input to the power circuit 72 by the connection of the starting switch 81, the reset circuit 73 detects this and outputs a reset pulse to CPU 71. In a step S1, when CPU 71 detects the reset pulse, CPU 71 is initialized in a step S2.

Next, CPU 71 detects a state of an input signal (step S3). In the step S3, the current state of the transfer switch 30, each rotational amount detecting sensor 41, 51, each starting position detecting switch 42, 52 is respectively detected and is respectively stored in the memory of CPU 71.

In case the transfer switch 30 is set to high speed operation, control is passed from a step S4 to a step S5, it is checked there whether the transfer switch is operated or not and when operation for switching to high speed operation is made, that is, when an operation mode signal showing high speed operation is first input from the transfer switch 30, a command signal is output to the relay driving circuit 78. The relay driving circuit 78 controls based upon the command signal so that each high speed/low speed switching relay 76, 77 is switched and sets so that driving voltage from each motor driving circuit 74, 75 is output to the high speed brush (step S6).

However, as each high speed/low speed switching relay 76, 77 is already set to the side of the high speed brush when operation for switching the transfer switch 30 is already made, no control for switching the relay 76, 77 is made.

Next, CPU 71 determines duty ratio and outputs a speed command signal (a PWM signal) corresponding to the duty ratio to each motor driving circuit 74, 75 (step S7). Hereby, each motor driving circuit 74, 75 rotates each wiper motor 11, 21 at duty ratio according to the speed command signal.

In case the transfer switch 30 is set to low speed operation, it is checked in a step S9 from the step S4 via a step S8 whether the transfer switch 30 is operated or not and when operation for switching to low speed operation is made, that is, when an operation mode signal showing low speed operation is first input from the transfer switch 30, a command signal is output to the relay driving circuit 78. The relay driving circuit 78 controls based upon the command signal so that each high speed/low speed switching relay 76, 77 is switched and sets so that driving voltage from each motor driving circuit 74, 75 is output to the low speed brush (step S10).

However, as each high speed/low speed switching relay 76, 77 is already set to the side of the low speed brush when operation for switching the transfer switch 30 is already made, no control for switching the relay is made.

Next, CPU 71 determines duty ratio as in the high speed operation and outputs a speed command signal (a PWM signal) corresponding to the duty ratio to each motor driving circuit 74, 75 (the step S7). Hereby, each motor driving circuit 74, 75 rotates each wiper motor 11, 21 at the duty ratio according to the speed command signal.

In case the transfer switch 30 is set to intermittent operation, intermittent operation is executed from the step S4 via the step S8 and a step S11. In the intermittent operation, each wiper motor 11, 21 alternately repeats the stop in time set by the intermittent operation volume control 31 and the low speed operation of one cycle. Then, CPU 71 checks whether each wiper motor 11, 21 is in a stop term or not (step S12), stops the output of a speed command signal (a PWM signal) when each wiper motor is in the stop term and instructs each wiper motor 11, 21 to stop (step S13).

In the meantime, in the intermittent operation, when each wiper motor 11, 21 is not in the stop term, CPU instructs each wiper motor 11, 21 to rotate as in the control at the low speed operation (the steps S9, S10 and S7).

In case the transfer switch 30 is set to "off", CPU 71 stops the output of a speed command signal (a PWM signal) and instructs each wiper motor 11, 21 to stop (the step S13). The control described above of the wiper apparatus is continuously executed until the power source of the vehicle is turned off and is finished when the power source of the vehicle is turned off (step S14).

(Determination of Duty Ratio)

Next, a method of determining duty ratio shown in the step S7 in FIG. 4 will be described referring to FIGS. 5 and 6.

Figure 5:
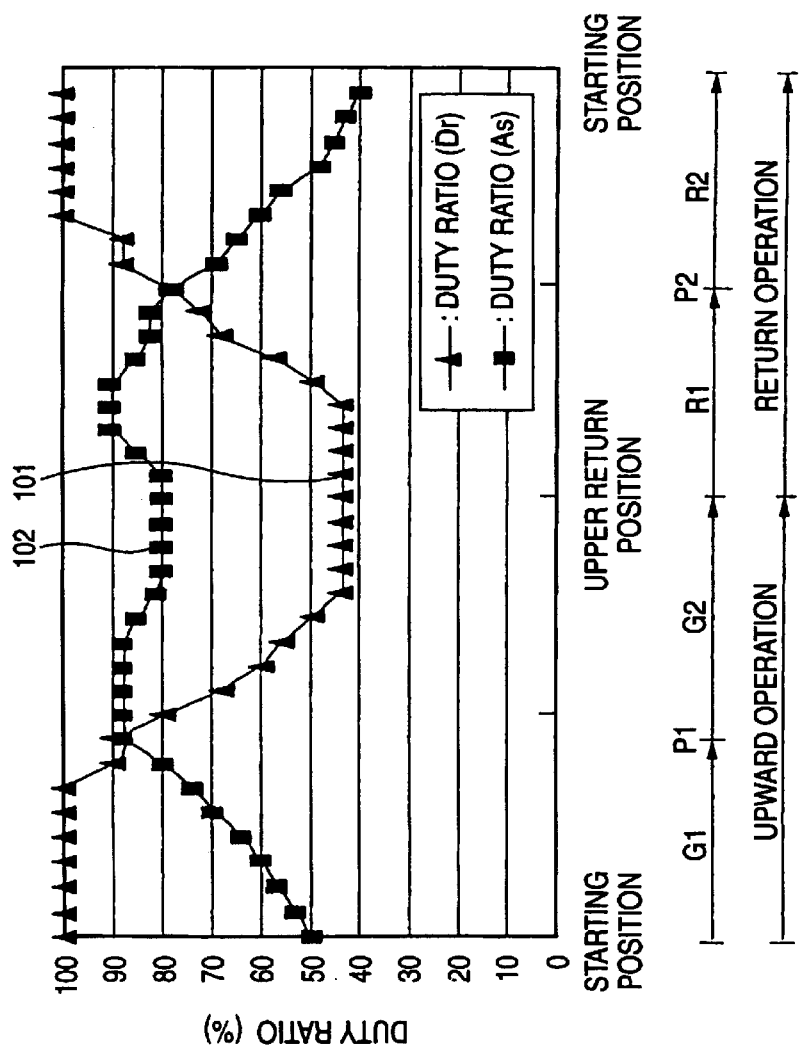
FIG. 5 shows a duty ratio pattern of each wiper motor in the embodiment of the invention.

FIG. 5 shows a duty ratio pattern used for controlling the driving of each wiper motor in this embodiment. That is, in this embodiment, while each wiper blade 10, 20 starts wiping operation from each starting position 2, is reversed in each return position 3, 4 on the upside and returns to each starting position 2 again, the duty ratio of the wiper motor 11 on the driver's seat side is varied as shown in a pattern 101 and the duty ratio of the wiper motor 21 on the passenger seat side is varied as shown in a pattern 102. The pattern of each duty ratio is predetermined in the memory of CPU.

That is, in the upward operation, in an interval G1 from the starting position 2 to a first wiping position P1 of the wiper blade 10 on the driver's seat side (See FIG. 1), an output level of current to the wiper motor 11 on the driver's seat side is set to the duty ratio of substantially 100% up to the vicinity of the first wiping position P1 and afterward, the duty ratio is gradually reduced. In the meantime, an output level of current to the wiper motor 21 on the passenger seat side in the interval G1 is set to the duty ratio of substantially 50% in the starting position 2 and afterward, the duty ratio is gradually increased up to the first wiping position P1. In the first wiping position P1, the duty ratio of each wiper motor 11, 21 is set so that it is substantially the same.

The first wiping position P1 is set in the vicinity of the trailing edge of the overlap area 1C, at which the wiper blade 10 goes out of the overlap area 1C. The wiper motor 11 on the driver's seat side is rotated at large rotating torque by driving each wiper motor 11, 21 at the duty ratio described above in the interval G1, the preceding wiper blade 10 on the driver's seat side 10 can be promptly moved in the upward operation and the collision of each wiper blade 10, 20 in the overlap area 1C is prevented.

In an end half of the succeeding upward operation, in an interval G2 from the first wiping position P1 to each return position at the upper end 3, 4, an output level of current to the wiper motor 11 on the driver's seat side is further reduced and the duty ratio is fixed at substantially 43% just before each return position at the upper end 3, 4. In the meantime, an output level of current to the wiper motor 21 on the passenger seat side in the interval G2 is maintained at the duty ratio of substantially 90 to 80%.

Hereby, in the interval G2, the wiper motor 21 on the passenger seat side is rotated at large rotating torque and the wiper blade 20 on the passenger seat side can be promptly moved. As a result, the delay of the wiper blade 20 on the passenger seat side in the interval G1 is caught up and each wiper blade 10, 20 can reach each upper return position 3, 4 substantially in synchronization.

Next, in return operation, in an interval R1 from the upper return position 4 to a second wiping position P2 of the wiper blade 20 on the passenger seat side (See FIG. 1), an output level of current to the wiper motor 21 on the passenger seat side is set to the duty ratio of substantially 90 to 80%. In the meantime, an output level of current to the wiper motor 11 on the driver's seat side in the interval R1 is set to the duty ratio of substantially 43% for a while since each upper return position 3, 4 and afterward, the duty ratio is gradually increased up to the second wiping position P2. In the second wiping position P2, the duty ratio of each wiper motor 11, 21 is set so that it is substantially the same.

The second wiping position P2 is set in the vicinity of an entry edge into the overlap area 1C at which the wiper blade 20 enters into the overlap area 1C. As the wiper motor 21 on the passenger seat side is rotated at large rotating torque by driving each wiper motor 11, 21 at the duty ratio described above in the interval R1, the wiper blade 20 on the passenger seat side is promptly moved. Therefore, the wiper blade 20 on the passenger seat side precedently enters the overlap area 1C and the collision of each wiper blade 10, 20 can be prevented.

In an end half of the succeeding return operation, in an interval R2 from the second wiping position P2 to the starting position 2, an output level of current to the wiper motor 21 on the passenger seat side is gradually reduced. In the meantime, an output level of current to the wiper motor 11 on the driver's seat side in the interval R2 is further increased up to the duty ratio of 100%.

Hereby, in the interval R2, the wiper motor 11 on the driver's seat side is rotated at large rotating torque and the wiper blade 10 on the driver's seat side can be promptly moved. As a result, the delay of the wiper blade 10 on the driver's seat side in the interval R1 is caught up and each wiper blade 10, 20 can reach the starting position 2 substantially in synchronization.

Figure 6:
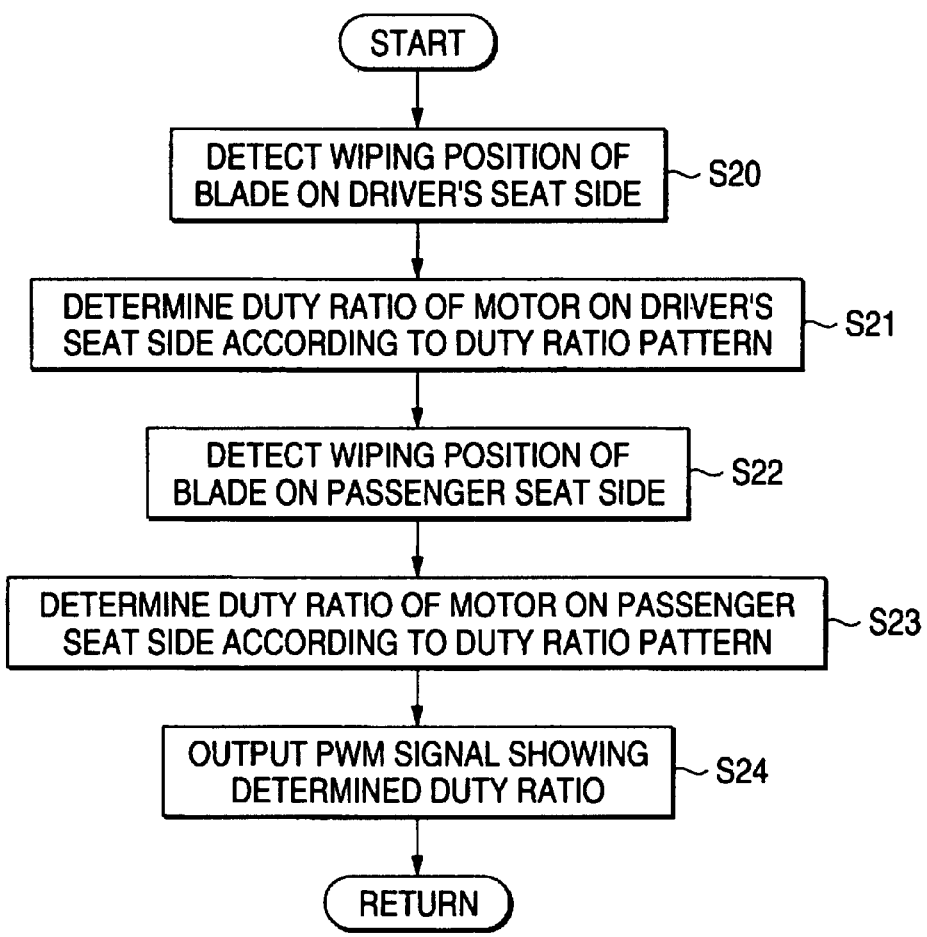
FIG. 6 is a flowchart showing control operation related to the determination of duty ratio in the embodiment of the invention.

FIG. 6 is a flowchart showing control operation related to the determination of duty ratio.

CPU 71 determines the duty ratio of driving voltage output to each wiper motor 11, 21 in the step S7 shown in FIG. 4 according to the flowchart in FIG. 6.

First, CPU 71 acquires the current wiping position of the wiper blade 10 on the driver's seat side (step S20). The wiping position of the wiper blade 10 on the driver's seat side can be acquired based upon a rotational pulse from the rotational amount detecting sensor 41 provided to the detector 40 on the driver's seat side as already described. Next, duty ratio equivalent to the current wiping position is determined according to the pattern 101 shown in FIG. 5 of the duty ratio of the wiper motor 10 on the driver's seat side (step S21).

Next, the current wiping position of the wiper blade 20 on the passenger seat side is acquired (step S22). The wiping position of the wiper blade 20 on the passenger seat side can be also acquired based upon a rotational pulse from the rotational amount detecting sensor 51 provided to the detector on the passenger seat side 50 as already described. Next, duty ratio equivalent to the current wiping position is determined according to the pattern 102 shown in FIG. 5 of the duty ratio of the wiper motor on the passenger seat side 20 (step S23).

CPU 71 outputs a speed command signal (a PWM signal) to each motor driving circuit 74, 75 based upon the duty ratio determined as described above of each wiper motor 11, 21 and driving voltage is output to the brush of each wiper motor 11, 21 from each motor driving circuit 74, 75 at the duty ratio according to the signal (step S24).

The invention is not limited to the embodiment described above.

For example, the pattern of the duty ratio shown in FIG. 5 is an example and it is desirable that a pattern of duty ratio is suitably set in view of the movement of each wiper blade.

For the output level of current for controlling the driving of each wiper motor, the duty ratio of driving voltage is adopted in the embodiment, however, in case each wiper motor is controlled at an output level of current except duty ratio, it need scarcely be said that the corresponding output level of current is to be set to be fitted to the preferred conditions as claimed.

Further, in the embodiment, the wiper blade on the driver's seat side is the first wiper blade, the wiper motor on the driver's seat side is the first wiper motor, the wiper blade on the passenger seat side is the second wiper blade and the wiper motor on the passenger seat side is the second wiper motor, however, the invention is not limited to the embodiment and a first wiper blade may be the wiper blade on the passenger seat side, a first wiper motor may be the wiper motor on the passenger seat side, a second wiper blade maybe the wiper blade on the driver's seat side and a second wiper motor may be the wiper motor on the driver's seat side.

Further, in the embodiment, the wiped areas of both the wiper blades vary between the upward operation and the return operation. However, the invention is not limited to the embodiment and the wiped areas may be identical between the upward operation and the return operation.

As described above, according to the invention, the suitable wiping operation in which the relation between preceding and succeeding wiper blades is kept can be ensured and the collision in the overlap area can be prevented respectively by controlling the output level of current to each wiper motor according to fixed conditions.

What is claimed is:

1. A method of controlling a wiper apparatus adapted for a vehicle, the wiper apparatus including:
   a first wiper blade for wiping a first wiped area of a windshield, the first wiper blade being reciprocated between a first starting position set on a side of a lower edge of the windshield and a first upper return position set on a side of a first side edge of the windshield,
   a first wiper motor for driving the first wiper blade,
   a second wiper blade for wiping a second wiped area of the windshield, the second wiper blade being reciprocated between a second starting position set on the lower edge of the windshield and a second upper return position set to a side of a second side edge of the windshield,
   a second wiper motor for driving the second wiper blade, and
   wherein the first and second wiper blades wipe an overlap area defined by an area on which the first wiped area and the second wiped area are overlapped such that the first wiper blade is moved in the overlap area prior to the second wiper blade in an overlapping manner in an upward operation from the starting positions to the upper return positions respectively, and such that the second wiper blade is moved in the overlap area prior to the first wiper blade in a return operation from the upper return positions to the starting positions,
   wherein the wiper apparatus is controlled by changing a mean output level of current to each wiper motor, comprising the steps of:
      (a) setting an output level of current to the first wiper motor so as to be higher than an output level of current to the second wiper motor, when the first wiper blade is moved from the starting position to a predetermined first wiping position in the upward operation; and
      (b) setting the output level of current to the second wiper motor so as to be higher than the output level of current to the first wiper motor, when the second wiper blade is moved from the second upper return position to a predetermined second wiping position in the return operation.

2. A method of controlling a wiper apparatus adapted for a vehicle according to claim 1, further comprising the steps of:
   (c) setting the output level of current to the second wiper motor so to be higher than the output level of current to the first wiper motor, when the first wiper blade is moved from the first wiping position to the first upper return position in the upward operation; and
   (d) setting the output level of current to the first wiper motor so as to be higher than the output level of current to the second wiper motor, when the second wiper blade is moved from the second wiping position to the second starting position in the return operation.

3. A method of controlling a wiper apparatus adapted for a vehicle according to claim 1, wherein
   the first wiping position is set in a vicinity of a trailing edge of the overlap area of the first wiper blade.

4. A method of controlling a wiper apparatus adapted for a vehicle according to claim 1, wherein the second wiping position is set in a vicinity of an entry edge into the overlap area of the second wiper blade.

5. A method of controlling a wiper apparatus adapted for a vehicle according to claim 1, wherein the output level of current to each wiper motor is controlled by a value acquired by dividing an output period of driving voltage output to each wiper motor by an output cycle.

6. A wiper apparatus adapted for a vehicle, comprising:
   a first wiper blade for wiping a first wiped area of a windshield, the first wiper blade being reciprocated between a first starting position set on a side of a lower edge of the windshield and a first upper return position set on a side of a first side edge of the windshield;
   a first wiper motor for driving the first wiper blade;
   a first motor driving circuit for outputting driving voltage input to the first wiper motor so as to rotate the first wiper motor;
   a second wiper blade for wiping a second wiped area of the windshield, the second wiper blade being reciprocated between a second starting position set on the lower edge of the windshield and a second upper return position set to a side of a second side edge of the windshield;
   a second wiper motor for driving the second wiper blade; and
   a second motor driving circuit for outputting driving voltage input to the first wiper motor so as to rotate the first wiper motor;
   wherein the first and second wiper blades wipe an overlap area defined by an area on which the first wiped area and the second wiped area are overlapped such that the first wiper blade is moved in the overlap area prior to the second wiper blade in an overlapping manner in an upward operation from the starting positions to the upper return positions respectively, and such that the second wiper blade is moved in the overlap area prior to the first wiper blade in a return operation from the upper return positions to the starting positions,
   wherein each motor driving circuits changes a mean output level of current to each wiper motor so that:
      (a) an output level of current to the first wiper motor is set to be higher than an output level of current to the second wiper motor, when the first wiper blade is moved from the starting position to a predetermined first wiping position in the upward operation; and
      (b) the output level of current to the second wiper motor is set to be higher than the output level of current to the first wiper motor, when the second wiper blade is moved from the second upper return position to a predetermined second wiping position in the return operation.

7. A wiper apparatus according to claim 6, wherein each of the first and second motor driving circuits changes an output level of current to each wiper motor so that:
 (c) the output level of current to the second wiper motor is set so to be higher than the output level of current to the first wiper motor when the first wiper blade is moved from the first wiping position to the first upper return position in the upward operation: and
 (d) the output level of current to the first wiper motor is set to be higher than the output level of current to the second wiper motor, when the second wiper blade is moved from the second wiping position to the second starting position in the return operation.

8. A wiper apparatus according to claim 6, wherein the first wiping position is set in a vicinity of a trailing edge of the overlap area of the first wiper blade.

9. A wiper apparatus according to claim 6, wherein the second wiping position is set in a vicinity of an entry edge into the overlap area of the second wiper blade.

10. A wiper apparatus according to claim 6, wherein each motor driving circuit controls the output level of current to each wiper motor by means of a value acquired by dividing an output period of driving voltage output to each wiper motor by an output cycle.

* * * * *